US012747722B1

(12) United States Patent
McIlvaine

(10) Patent No.: US 12,747,722 B1
(45) **Date of Patent: *Sep. 29, 2026**

(54) NO FUNNEL PROPLESS WIND TURBINE AND RETROFIT METHOD

(71) Applicant: Clifford J. McIlvaine, St. Charles, IL (US)

(72) Inventor: Clifford J. McIlvaine, St. Charles, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/439,881

(22) Filed: Jan. 5, 2026

Related U.S. Application Data

(63) Continuation-in-part of application No. 19/095,672, filed on Mar. 31, 2025, now Pat. No. 12,516,659.

(51) Int. Cl.

| | |
|---|---|
| ***F03D 3/04*** | (2006.01) |
| ***F03D 1/04*** | (2006.01) |
| ***F03D 80/00*** | (2016.01) |
| ***F03G 3/08*** | (2006.01) |

(52) U.S. Cl.
CPC ........... *F03D 80/004* (2023.08); *F03D 1/053* (2023.08); *F03G 3/08* (2013.01); *F05B 2260/301* (2013.01); *F05B 2260/50* (2013.01)

(58) Field of Classification Search
CPC ... F03G 3/08; F03D 1/04; F03D 15/00; F03D 80/004; F03D 3/04; F03D 3/0472; F03D 3/0436; F03D 3/0454; F03D 3/0463; F03D 3/0481; F03D 3/049; F05B 2260/40
See application file for complete search history.

(56) References Cited

U.S. PATENT DOCUMENTS

| | | | | | |
|---|---|---|---|---|---|
| 1,315,595 | A * | 9/1919 | Clark | F03D 80/70 | 244/103 S |
| 1,607,317 | A * | 11/1926 | Spencer | F03D 3/0454 | 415/905 |
| 4,279,569 | A * | 7/1981 | Harloff | F01D 1/14 | 415/53.3 |
| 4,457,666 | A * | 7/1984 | Selman, Jr. | F03D 3/0481 | 415/203 |
| 5,083,899 | A * | 1/1992 | Koch | F03D 3/049 | 415/4.2 |

(Continued)

FOREIGN PATENT DOCUMENTS

WO 2023/147893 A1 8/2023

*Primary Examiner* — Nathaniel E Wiehe
*Assistant Examiner* — Joshua R Beebe
(74) *Attorney, Agent, or Firm* — BUCHANAN INGERSOLL & ROONEY PC

(57) ABSTRACT

A fluid stream turbine includes a flywheel rotatably mounted to a central axis post and having a plurality of blades, and a housing rotatable mounted to the central axis post, the housing including a curved side wall configured to cover a portion of a radial periphery of the flywheel, a top wall configured to cover a portion of a top side of the flywheel, an adjustable rudder disposed on the top wall and configured to cause the housing to rotate such that a front of the housing always faces directly into a fluid stream, a first diverter scoop disposed at the front of the housing and configured to direct a first portion of the fluid stream toward the plurality of blades, and a second diverter scoop disposed at a rear of the housing and configured to direct a second portion of the fluid stream toward the plurality of blades.

45 Claims, 8 Drawing Sheets

(56) References Cited

U.S. PATENT DOCUMENTS

| | | | | |
|---|---|---|---|---|
| 7,605,491 | B1 * | 10/2009 | Chung | F03D 9/25<br>290/55 |
| 8,052,372 | B1 * | 11/2011 | Dvorak | F03D 3/0454<br>415/2.1 |
| 9,068,557 | B1 * | 6/2015 | Garrett | F03D 3/0463 |
| 9,273,665 | B1 * | 3/2016 | Krippene | F03D 3/005 |
| 2012/0141252 | A1 * | 6/2012 | Dvorak | F03D 3/0454<br>415/227 |
| 2013/0307276 | A1 * | 11/2013 | Ko | F03D 3/02<br>290/55 |
| 2017/0130697 | A1 * | 5/2017 | Huang | F03D 3/005 |
| 2021/0207579 | A1 | 7/2021 | Barben | |
| 2025/0230802 | A1 | 7/2025 | Mcilvaine | |

* cited by examiner

NO FUNNEL PROPLESS WIND TURBINE AND RETROFIT METHOD

CROSS REFERENCE TO RELATED APPLICATIONS

The present application is a continuation-in-part of U.S. patent application Ser. No. 19/095,672 filed Mar. 31, 2025, the entire content of which is incorporated by reference herein.

FIELD OF THE INVENTION

The present invention relates generally to no funnel propless fluid stream turbine devices which collect and convert fluid stream energy into usable electrical and mechanical energy.

BACKGROUND

Over the years, a number of approaches have been taken to produce large amounts of clean, low-cost pollution-free electrical and mechanical energy around the world, in various environmental conditions, to reduce and/or eliminate the use of dirty fossil fuels which are known to cause pollution and health problems. Such approaches have not fully solved the problems of collecting and converting wind, water, and solar energies into usable electrical and mechanical energies for high-efficiency output.

There is a need for simple, reliable, pollution free, environmentally safe propless energy collection and conversion systems, that can retrofit and replace the many old and broken three bladed prop generator units around the world that have failed, and that can generate more energy output for given size than the current three bladed props, and does not kill flying creatures.

SUMMARY

Devices according to the present application are generally variations of propless single turbine fluid stream energy collection and conversion devices. The devices utilize a horizontally mounted wheel with special curved, tall, narrow, large surface area blades which extend past the outer surface of the wheel. The special curved blades are configured to collect and momentarily absorb additional fluid stream energy from 360 degrees around the wheel without a funnel or housing to direct the wind or water into the blades. Such a wind turbine or tidal turbine is scalable from one foot in diameter to several hundred feet in diameter.

The greater radial diameter the wheel is, the more efficient it becomes by taking advantage of the larger centripetal force and very heavy mass of material built into the outer one third of the wheel and blades. This very heavy mass acts as a flywheel which automatically stores and releases a large amount of mechanical energy, which stabilizes the speed and orientation of the wheel by using its precession effect. It also transfers a large amount of kinetic energy down to the center rotational axis pivot point, where the electrical generator and mechanical power take-off points may be located, and which contributes substantial mechanical force at the inner wheel hub.

The propless wind turbine may be disposed at any height from several feet off the ground to several hundred feet above the ground. The turbine can automatically collect fluid stream energy from any direction 360 degrees around the torus or other wheel without using a funnel or housing. Exemplary embodiments of the wind turbine utilize a wind blocker/adjustable rudder/multiple redirection diverter scoops assembly which greatly improves the wheel's efficiency and can help the environment even more by greatly mitigating and almost eliminating flying creature fatalities as compared to the three bladed prop units.

The wind turbine is easy to build and mass produce with common "off the shelf" materials available today. Lightweight materials such as aluminum, carbon fiber, fiberglass, and their equivalents may be used, resulting in lower efficiency. High mass density materials such as concrete, lead, stainless steel, cast iron, glass or similar materials may be used for increased efficiency and reliability to store and release large amounts of mechanical energy.

DETAILED DESCRIPTION

Figure 1:
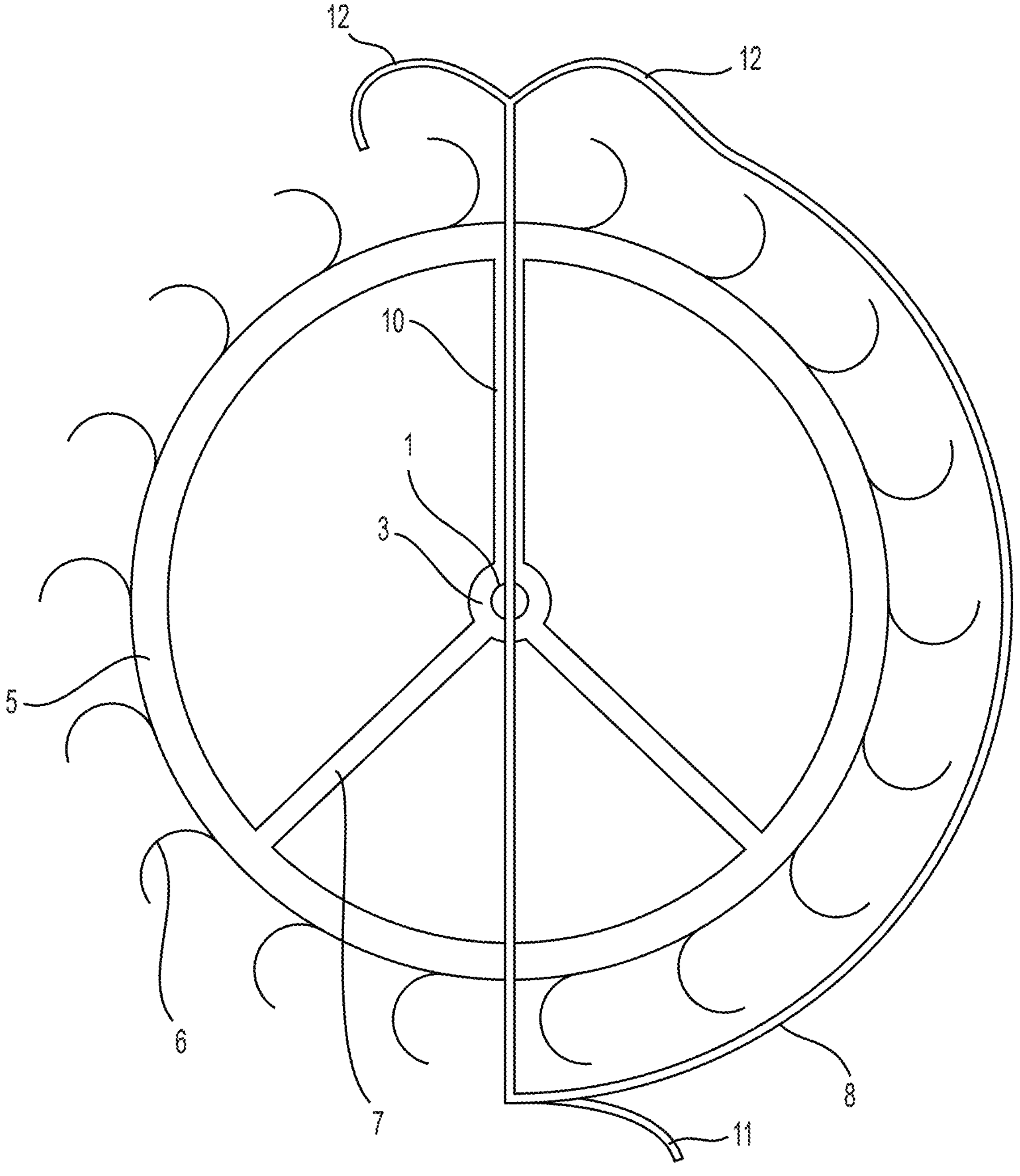
FIG. 1 is a cutaway top view of a fluid stream turbine according to exemplary embodiments of the present application.
Figure 2:
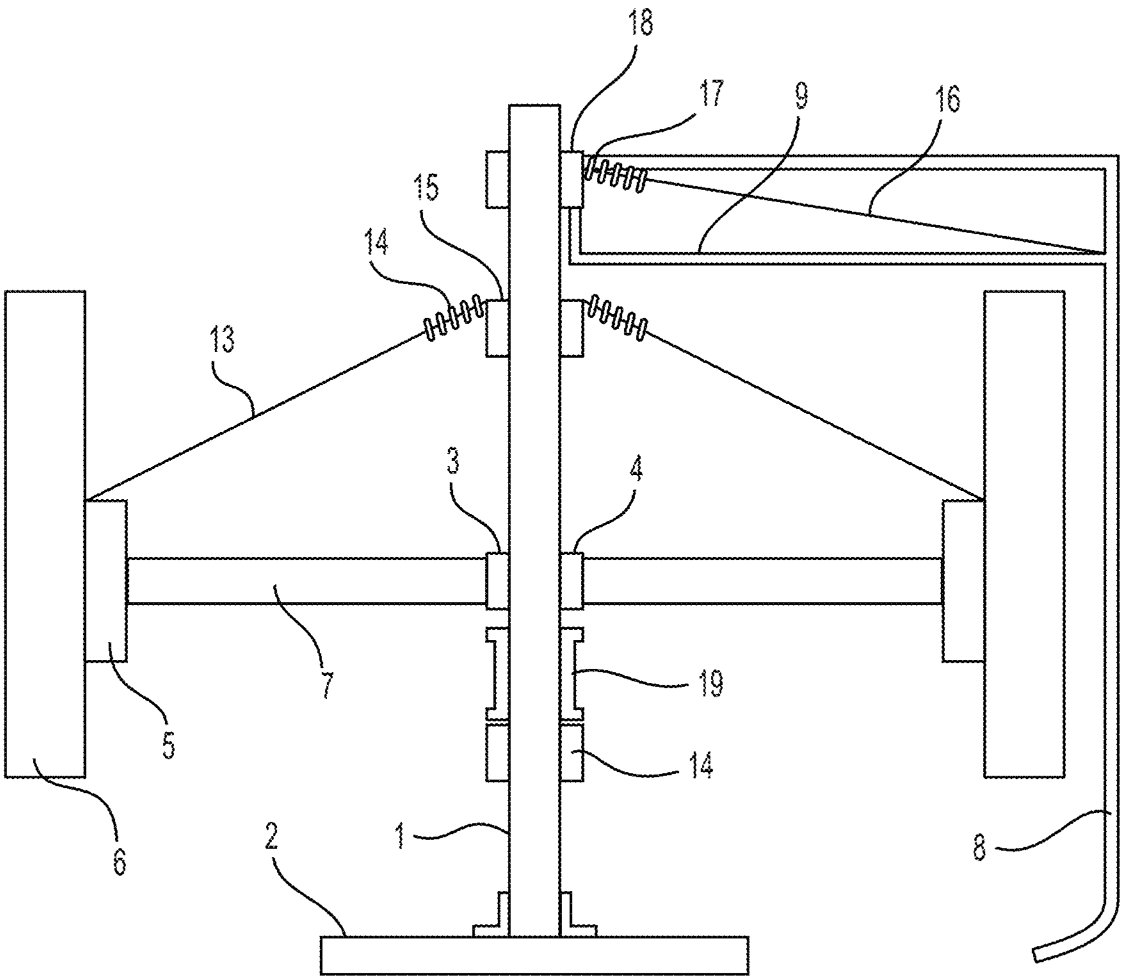
FIG. 2 is a cutaway side view of a fluid stream turbine according to exemplary embodiments of the present application.
Figure 3:
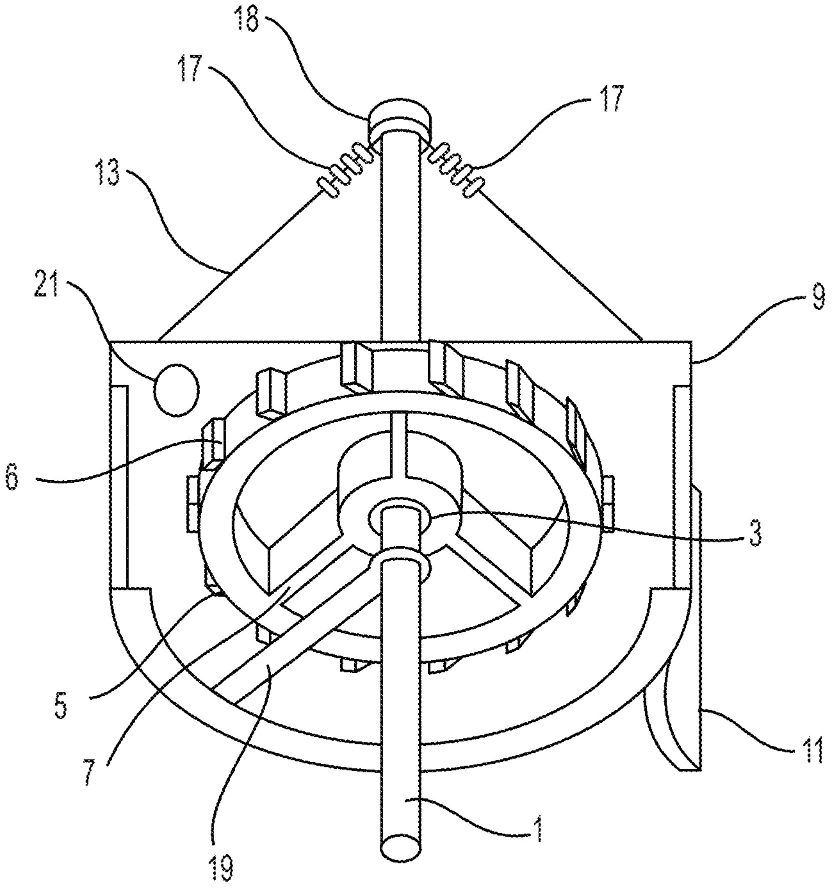
FIG. 3 is a perspective view of a fluid stream turbine according to exemplary embodiments of the present application.
Figure 4:
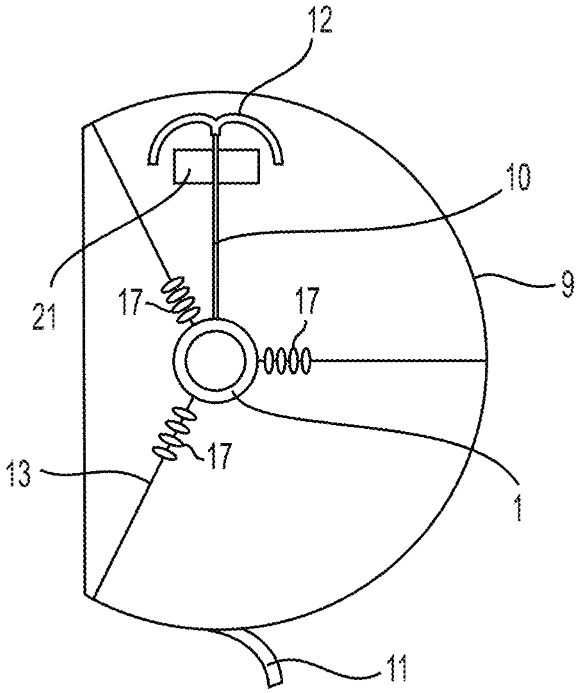
FIG. 4 is a top view of a fluid stream turbine according to exemplary embodiments of the present application.

Set forth below with reference to the accompanying drawings is a detailed description of exemplary embodiments of no funnel propless fluid stream conversion devices.

Exemplary embodiments comprise a horizontal heavy mass or light mass flywheel with numerous large curved surface area collection blades at the outer edge of the wheel. Each of these tall large surface area curved fluid stream collection blades are designed to collect and momentarily absorb and release additional fluid energy into each blade from any direction the fluid stream moves around the wheel, without the use of a collection funnel or housing. The flywheel is scalable from about one foot in diameter to several hundred feet in diameter. The greater the wheel diameter is, the more efficient it becomes, by taking advantage of the centripetal force at the outer one third of the wheel where a very heavy mass is concentrated.

This very heavy mass at the outer edge also automatically stores and releases large amounts of kinetic energy, which stabilizes the speed and orientation of the wheel by using the gyroscopic precession effect. To further increase the wheel device efficiency and double its mechanical energy output for any given size wheel diameter, a special curved combination "wind" fluid stream energy blocker/wind direction adjustable rudder/fluid stream energy collection/multiple redirection diverter scoops assembly is used.

This extra element does multiple functions at once. First, it blocks all the wind fluid stream energy, that would normally impede the turbine blades and slow down the flywheel at its front outer leading edge. This extra element blocker/scoop device preferably is located outside the rotation of the torus or other wheel blades, extending downward and covering all the wheel blades from top to bottom. The portion of the device that is on top of half the blades acts as a wind direction adjustable rudder to center the front and rear collection diverter scoops to capture the maximum amount of fluid stream energy at the back and front of the flywheel, at the same time.

The special device is functional as a fluid stream energy diverter scoop which collects additional fluid stream energy from the front of the wheel and changes its direction from about 90 degrees to about 180 degrees at the back of the wheel which now directs additional fluid stream energy on a plurality of blades at the back side of the wheel. The extra fluid stream energy blocker/wind direction adjustable rudder/fluid stream energy collection/redirection scoop device is mounted on separate low friction bearing surfaces such as magnetic bearings or equivalent and rotates independently of the turbine flywheel and blades. This action increases the amount of fluid stream energy collected by collecting energy from both sides of the flywheel at the same time from any given wind fluid stream direction. The center of the wheel uses one vertical rotational axis post which may be sized from several inches in diameter to several feet in diameter, and from a number of feet tall to several hundred feet tall depending on the diameter of the wheel. The vertical rotational axis post may use several conventional oil lubricated bearings or very low friction bearings, for example, but not limited to, magnetic bearings located at various pivot points along the length of the vertical rotational axis post. Each pivot point may have a separate function with its own bearings, rotating in different directions at the same time around the rotational axis post. Below the flywheel at the lower end of the rotational axis post may be one or more electrical or mechanical power take-off points to accommodate one or more belt, chain, cog, gear, or similar drive functions which allow separate independent devices to operate at same time, for example, such as but not limited to, generators or pumps to be driven. Further, a direct drive mechanical power transfer sleeve coupling may be used to spin-up and drive an electrical energy generator.

This apparatus may also be adapted for use in hydroelectric applications, and indeed in any application requiring mechanical or electrical energy derived from fluid stream energy such as air/gas, or various types of moving fluids. The liquid type hydro devices are normally more efficient than air/gas devices due to the substance density and can be made smaller to achieve equivalent energy transfer.

According to the application, a medium size wind turbine wheel may be ten feet in diameter. The curved blade size extending from both sides of the torus or other wheel may be eight feet tall and four feet wide, which would be thirty-two square feet of collection surface area for each blade. A 10 foot diameter wheel with 20 blades would yield 640 square feet of blade collection surface area. The vertical rotational axis post for this size wheel may be fifteen feet tall and four inches in diameter, joined as by welding or the like to a one quarter inch or greater thickness bottom support plate which may be five feet square or larger to accommodate and dissipate the flywheel device weight.

Any one of several structures may be used to support the heavy toroidal outer mass of the flywheel. The horizontal turbine wheel may be made similar, for example, but not limited to a bicycle wheel with a plurality of tension separation spokes. In another configuration, a thin solid round plate may be employed. In one preferred structure, a minimum of three triangular cross-section shaped beams (equal sides 3 or 4 inches) is recommended. The beams may be made of metal, carbon fiber, fiberglass or similar high strength materials and may be used to support the outer wheel.

To carry the weight of any turbine wheel and blades larger than about four feet in diameter generally requires for example, but not limited to, either:

multi-strand flexible stainless steel tension support cables on the top side of the flywheel, or from the bottom side, heavy triangular cross-section support beams or similar flat beams attached to the inner edge of the flywheel and bottom rotational axis bearing at the support plate. In addition, retrofit requires the bottom beams be attached to a circular i-beam raceway that is fixed to the existing tower.

In one preferred example, top side multi-strand stainless steel tension cables are used. A number of multi-strand flexible stainless steel or equivalent support cables are required to be attached above each triangular cross-section beam used where the outer end of the support cable is attached to a top side of the wheel at the blades, and the other end of the support cable is attached to an adjustable turnbuckle, which is attached to the rotational axis post bearing. This allows precision tension adjustment to support the flywheel weight. Depending on the diameter of the wheel, and the weight carried, the support cable angle can vary.

The wind direction adjustable rudder/blocker/diverter scoop assembly, when used, may be attached to the top rotational axis post bearing disposed above the previously described wheel support cables bearing. If these top support cables are required, they can be made the same as lower wheel support cables. A minimum of three support cables is recommended to hold up the wind blocker/diverter scoop device, for example, but not limited to one at each end of the device and one at the top outer center of the device. In addition, a bottom triangular or equivalent support beam about three inches per side is attached to the bottom rotational axis bearing at the inner end. The outer end of the beam is attached to the center bottom of the wind blocker assembly wall. For the 3 bladed prop conversion, the bottom wind blocker beams may attach to a circular I (eye) beam rail raceway which is bolted to the legs of the existing windmill tower. The inner end of the wind blocker I (eye) beams has wheels attached to them which fit inside the I (eye) beam rail (similar to roller coaster car wheels) which allows the wind blocker unit to rotate freely 360 degrees around the tower without coming loose under any stress conditions.

While this assembly normally uses very light, strong materials to support its various functions, large wheels may require extra support at the outer blade area. One may utilize the support arrangement described for the flywheel support or equivalent. In exemplary embodiments, the fluid stream turbine is precision balanced to extend its useful service life and achieve greater efficiency.

There are broken three-bladed prop windmills littering the landscape from existing wind farms around the world. Using the propless no funnel wind turbine configuration with a horizontal flywheel or separation spoke version is a simple low-cost fix for the high (such as two hundred or so foot tall) tower generator units. It solves most problems, including mitigating flying creatures kills, which has been a major environmental concern. It can increase electrical power output by a factor of two or three, depending on the size of the flywheel and the kind of generator used.

Another immediate use for an exemplary embodiment configured in the light-weight tension separation spoke-wheel version is to retrofit—with the horizontal basic plane wheel version—the existing broken three-bladed prop windmills littering the landscape from existing wind farms around the world. Using this horizontal wheel version is a simple low-cost fix for the high (such as two hundred or so foot tall) tower generator units. This may be done by replacing long prop blades with a 200 foot or smaller diameter turbine wheel operating in the horizontal plane. This wheel may be smaller or the same diameter as the length of the prop blades removed.

This immediate use for an exemplary embodiment is to retrofit the three bladed prop windmill with a horizontal plane version of the proposed application. This may be done using the lightweight tension separation spoke wheel version or the heavyweight flywheel turbine version which may include the bird saver wind blocker. This may be achieved by removing the several hundred foot long three-bladed prop blades from the existing horizontal generator driveshaft, and replacing them with a small or medium size vertical drive wheel attached to the same horizontal driveshaft. This vertical wheel is mated up with a several hundred foot or smaller diameter turbine flywheel operating in the horizontal plane. This horizontal wheel may be smaller or greater diameter than the length of the prop blades removed, depending on energy requirements.

The vertical drive wheel which replaces the three bladed prop blades may be mated to the horizontal turbine flywheel in several ways:

- one method is for the outer radial diameter surface of the drive wheel to have a gear drive configuration that meshes with the flywheel. For this method, the underside of the turbine wheel has a channel with rectangular notches around a 360 degree circle which mesh with a gear on the vertical drive wheel.
- another method is for the vertical drive wheel's outer radial diameter surface to be fitted or molded with tough grip treaded rubber tire material, so this wheel now acts similar to a vehicle's rubber tire wheel.
- a third method is for the vertical drive wheel's outer radial diameter surface to be equipped with a tire that is inflated. The tire may be filled with air gas, nitrogen gas, helium gas, or low-density soft polyurethane foam or similar flexible materials.
- the simplest method to power the existing three bladed prop generator is to remove the three bladed props, and just rotate the existing generator driveshaft from horizontal to vertical, and attach the 50 to approximately 100-foot diameter flywheel directly to the vertical generator drive, depending on energy requirements.

In the second and third methods listed above, the treaded vertical drive wheel fits into the round circular channel on the underside of the horizontal turbine flywheel, which transfers mechanical energy from the flywheel to the drive wheel. The underside of the round circular channel can have a rough sandpaper or dimpled surface for the rubber tire to grip more efficiently.

The existing three bladed prop drive rotates in a clockwise manner, same as the new horizontal flywheel does, when direct coupled to the existing three bladed prop drive. Thus, it is essential that, to keep the three bladed prop drive rotating in the same clockwise direction when using the vertical drive wheel, the blades on the horizontal turbine flywheel be flipped 180 degrees end-for-end. This will now cause the horizontal turbine flywheel to rotate in the counter-clockwise direction. The bird saver scoop wind blocker assembly will also need to be rotated so it is now on the left side of the turbine flywheel.

It is recommended that due to the huge collection surface area now employed high at the top of the existing tower with the horizontal turbine wheel, each old three bladed prop support tower be equipped with three equally spaced support cable multi-strand stainless steel guy wires which are fitted with three adjustable turnbuckles to ensure constant tension on the guy wires around the tower to prevent tower pushover in high winds.

Additional advantages over the three bladed prop units are that the wheel lays flat with reference to the ground, and it rotates in the horizontal plane with large surface area curved blades, and never changes elevation high above ground, allowing the blades to capture the more reliable and more consistent fluid flow at this higher elevation. In addition, the gyroscopic spinning effect stabilizes the entire unit. In contrast, with a three bladed prop windmill, each prop also has a very small surface area along its length and the outer tip, where a large surface area is needed to fully capture and convert wind (fluid stream) energy into mechanical energy. In addition, the prop blades try to capture fluid stream energy at various elevations off the ground at the same time, which causes inconsistent energy conversion, resulting in prop bending and reduced efficiency.

To solve these problems, one method is to remove the three-bladed props, then install the horizontal wheel on top of the existing generator housing. This changes the prop to wheel orientation by 90 degrees. If the existing generator is still usable, just rotate the generator drive up from horizontal to vertical, and attach it to the wheel. This may double the electrical power generated in low wind conditions. To get even more efficiency and protect flying creatures, the special wind blocker/wind direction adjustable rudder/diverter scoop bird saver device may be added to the top and outside of the wheel blades. If these steps are taken, all of the existing low efficiency outdated three-bladed prop generators can be given a second more productive life instead of being torn down and scrapped.

One more problem associated with current three-bladed props is flying creature fatalities—the prop tip is so small and may be moving so fast over a very large kill area that flying creatures cannot see the prop; that is why they get killed. Also, the prop tips vary from 50 feet to 250 feet above the ground, covering a tremendous horizontal and vertical possible kill area for flying creatures flying from most directions. This apparatus has a very large surface area per blade for the flying creatures to see, which always stays at the same elevation from the ground, so flying creatures can avoid contact. In addition, the bird saver wind blocker device element if installed, will cover all the large collection blades, normally on the right-hand side of one half of the wheel; therefore, flying creatures are not even exposed to any moving blades on half the wheel. All the flying creatures would hit is a 10-foot-high curved wind blocker wall, either stationary or slowly moving back and forth several feet (to adjust for change in wind direction) blocker device element.

The flying creature problem is now mostly solved, which should make environmentalists happy.

In exemplary embodiments, torus or other wheel tension support cables utilizing adjustable turnbuckles for precision tension adjustments, and/or wind blocker device tension support cables utilizing adjustable turnbuckles for precision tension adjustment are provided. In exemplary embodiments, the flywheel is a lightweight wheel similar to a bicycle wheel that utilizes tension spokes which cross; the difference for this apparatus is the tension spokes are straight with each other and never cross each other. Or it is a torus wheel cast or molded with heavy cast iron material for a solid one piece very heavy wheel. Or it is a torus wheel cast or molded with heavy poured in place, (or poured in a factory) steel reinforced concrete to achieve a continuous one piece very heavy wheel. In exemplary embodiments, a wind or tidal turbine is scalable from one foot in diameter to several hundred feet in diameter; the greater radial diameter the wheel is, the more efficient it becomes by taking advantage of the larger centripetal force created, utilizing very heavy wheel mass at the outer one third of the wheel, and the heavy mass wheel automatically stores and releases a large amount of mechanical energy while spinning, which stabilizes the speed and orientation of the wheel by using its precession effect.

An exemplary embodiment is illustrated in FIGS. 1-4. The exemplary fluid stream turbine includes a central axis post 1, which can be a vertical pole, for example, mounted to a base 2 fixed to the ground, for example. Alternatively, the central axis post 1 could be fixed to a moving structure, such as the roof of a vehicle.

Rotatably mounted to the central axis post 1 is a flywheel. In the exemplary embodiment, the flywheel includes a central ring 3 rotatably supported by a first bearing 4 on the central axis post 1, an outer ring 5 supporting a plurality of curved blades 6, and a plurality of beams 7 extending radially between the central ring 3 and the outer ring 5. Although the flywheel of this embodiment is of a spoked wheel configuration, the flywheel supporting the blades 6 could have other configurations as discussed in detail above. The blades 6 are curved toward a direction opposite the intended direction of rotation. For example, in the view of FIG. 1, the blades 6 are curved in the counterclockwise direction, and the wheel is intended to spin clockwise.

Also rotatably mounted to the central axis post 1 is a housing including a curved side wall 8 configured to cover a portion of a radial periphery of the flywheel, a top wall 9 configured to cover a portion of a top side of the flywheel, and an adjustable rudder 10 disposed on the top wall 9 and configured to cause the housing to rotate such that a front of the housing always faces directly into a fluid stream. For example, in the orientation illustrated in FIG. 4, the direction of the fluid stream is from the bottom of the page to the top of the page. As illustrated in that figure, the adjustable rudder 10, which extends from a center of the top wall 9 to the back of the top wall 9, will orient the housing so that the front always faces the fluid stream. Furthermore, in this orientation, the curved side wall 9 blocks the fluid stream from impinging on the back (outwardly curved) surfaces of the blade 6. In this regard, such impingement would undesirably urge the flywheel to spin counterclockwise, which is opposite to the desired direction.

The housing also includes a first diverter scoop 11 disposed at the front of the housing and configured to direct a first portion of the fluid stream toward the plurality of blades 6, and a second diverter scoop 12 disposed at a rear of the housing and configured to direct a second portion of the fluid stream toward the plurality of blades 6. In the exemplary embodiment, the first diverter scoop 11 is positioned below the top wall 9 and directs a portion of the fluid stream that would have hit the back surfaces of the blades 6 absent the housing, toward front surfaces of the blades 6, as is evident from FIG. 4.

In the exemplary embodiment, the second diverter scoop 12 is positioned above the top wall 9 and at rear of wheel extends full length above top of wheel and below bottom of wheel, behind the adjustable rudder 10, and is configured to direct a portion of the fluid stream that would otherwise pass over and under the blades 6 down through an opening 21 in the top wall 9 and towards the front of the blades 6. This configuration of the housing and its diverter scoops enables the energy of the fluid stream to be transferred to the flywheel at much higher efficiency, without the need for a funnel.

In the exemplary embodiment, additional support for the flywheel is provided by a plurality of first cables 13 each having a first end rotatably supported, via a first adjustable turnbuckle 14, by a second bearing 15 on the central axis post 1 above the first bearing 4, and a second end attached to and supporting the outer ring 5. Preferably, each cable 13 is disposed directly above a corresponding beam 7.

Additionally, the housing is supported by a plurality of second cables 16 each having a first end rotatably supported, via a second adjustable turnbuckle 17, by a third bearing 18 on the central axis post 1 above the second bearing 15, and a second end attached to and supporting the housing. Additional support for the housing is provided by a plurality of beams 19 that extends radially inward from the side wall 8, below the flywheel, and is rotatably supported by the central axis post 1 bearing. In the figure, only one beam 19 is shown, the others being removed for clarity.

All turnbuckles described in this application, including the turnbuckles 14 and 17 can be spring-loaded, or can be adjustable limited travel magnetically loaded turnbuckles. One preferred example is to use two or more high energy circular permanent magnets which repel each other. Another method is to use high energy controllable electromagnets which repel each other.

A power take-off sleeve 29 disposed on the central axis post 1 between the first bearing 4 and a fourth bearing 20 is configured to rotate with the flywheel and transfer mechanical energy produced in the flywheel to other devices. For example, but not limited to, a generator can be provided at the power take-off sleeve to generate electrical energy, or a pump, to pump liquid. Alternatively, for example, the mechanical energy can be transferred to another mechanical or electrical device via a chain, driven by the power take-off sleeve. Of course, other arrangements for utilizing the mechanical energy of the power take-off sleeve could easily be envisioned by an ordinarily skilled artisan.

Figure 5:
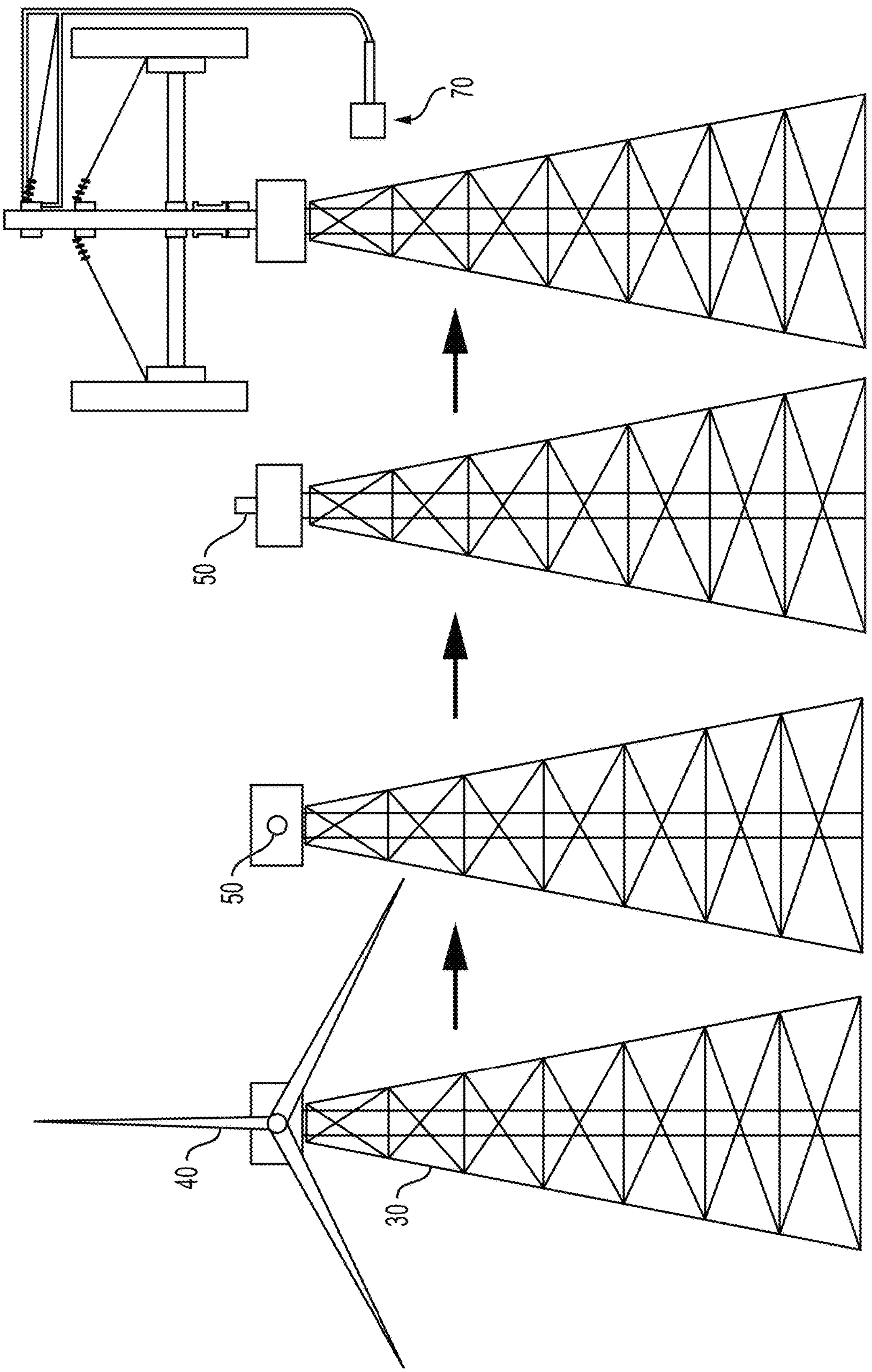
FIG. 5 is a schematic view of a method of retrofitting a fluid stream turbine to a tower of an existing three bladed windmill.

As illustrated in the FIG. 5 schematic, retrofitting of fluid stream turbines as described above to a tower 30 of an existing three bladed windmill can be performed simply by removing the three bladed windmill props 40, reorienting the horizontal driveshaft 50 to vertical, and installing the fluid stream turbine horizontal wheel so that it is operatively connected to the existing (now vertical) generator drive.

Figure 6:
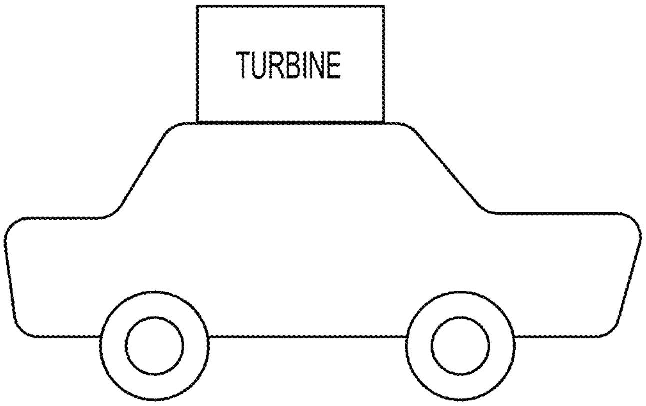
FIG. 6 is a schematic view of an automobile equipped with a fluid stream turbine.

Furthermore, a fluid stream turbine as described above can be installed on a vehicle, such as an electric vehicle to—for example—charge the batteries while moving or stationary, as illustrated in the FIG. 6 schematic.

Figure 7:
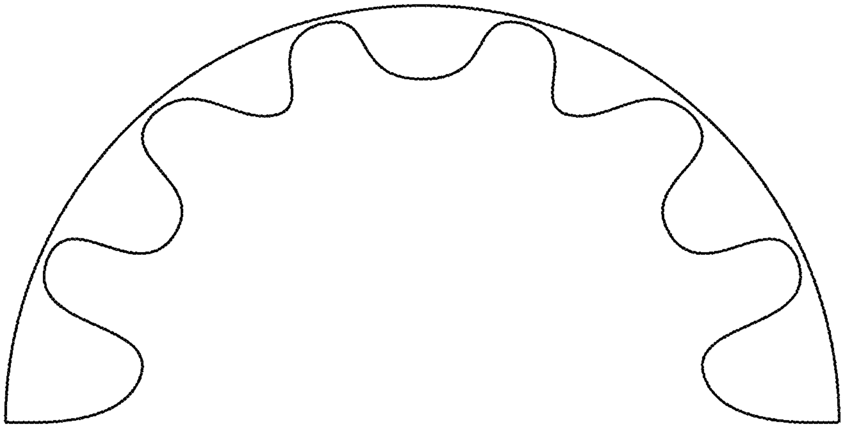
FIG. 7 is a top view of a corrugated inside protrusion surface of curved blade for increased efficiency with a fluid stream turbine.

FIG. 7 illustrates a top view of a corrugated blade design for use with fluid stream turbines as described above. By providing mini-corrugated protrusions only at the inside-curved collection surface area, which run the full length of the blade and increases blade surface area, the blades will collect and momentarily hold the fluid stream energy substance, which causes the wheel to absorb additional fluid stream energy, which converts into mechanical energy causing the wheel to spin, with increased intensity.

Figure 8:
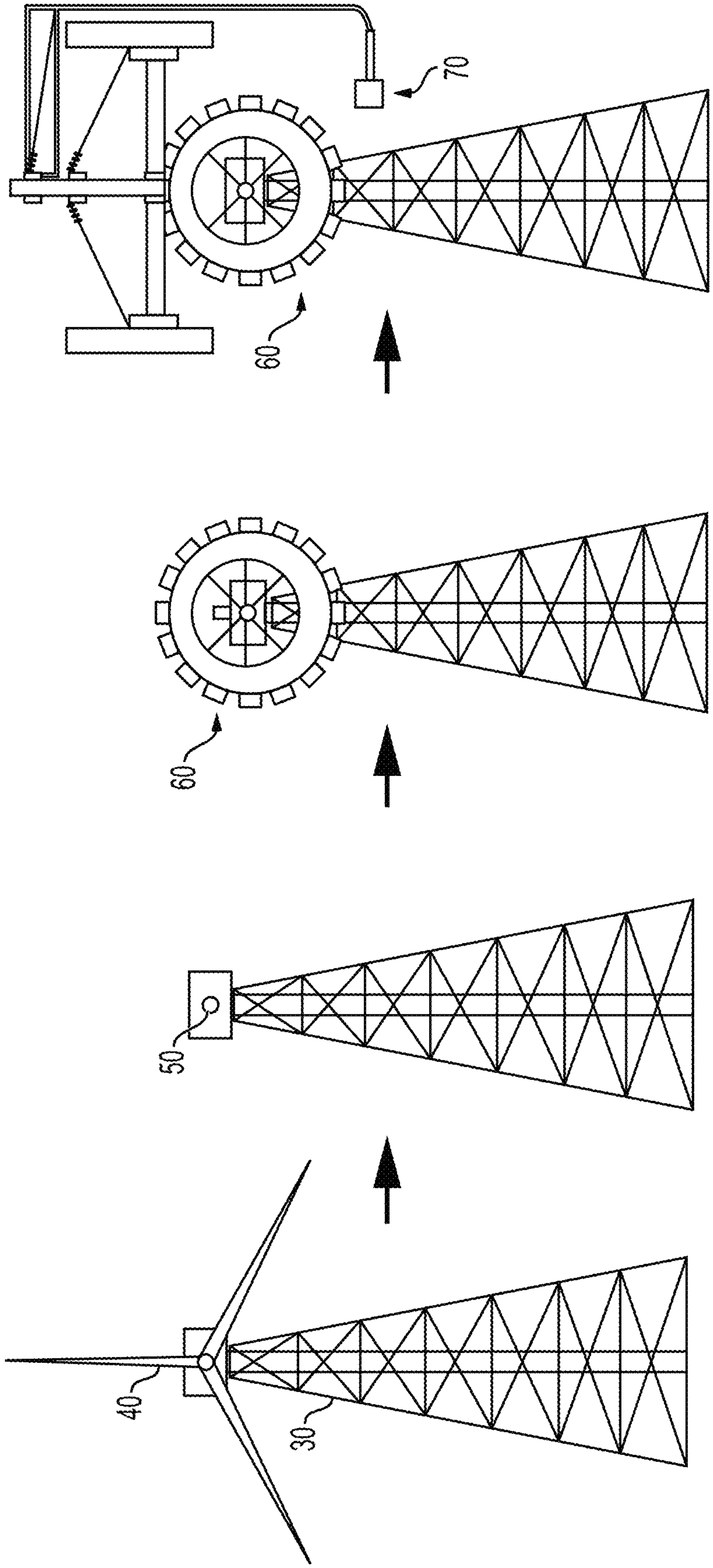
FIG. 8 is a schematic view of another method of retrofitting a fluid stream turbine to a tower of an existing three bladed windmill.

FIG. 8 illustrates another way to retrofit the old three bladed prop windmills, which to simply remove the three bladed props 40 from the horizontal driveshaft 50 and install a vertical drive wheel 60 on the horizontal driveshaft. The vertical drive wheel can be, for example, a gear drive which meshes with a gear of the horizontal turbine wheel, or have a rubber tire tread configuration which frictionally engages with a channel in an underside of the horizontal turbine wheel. Then install the horizontal turbine wheel to the central rotational axis post on top of the existing windmill generator housing. The larger horizontal turbine wheel meshes with the smaller vertical prop drive wheel to now power the generator.

In the FIG. 5 and FIG. 8 retrofit configuration, instead of being supported by the central axis post, the lower beams 19 are shortened and supported by a circular track 70 that is supported by the windmill body via a mounting arrangement. A preferred track and mounting arrangement are illustrated in detail in FIGS. 9 and 10.

Figure 10:
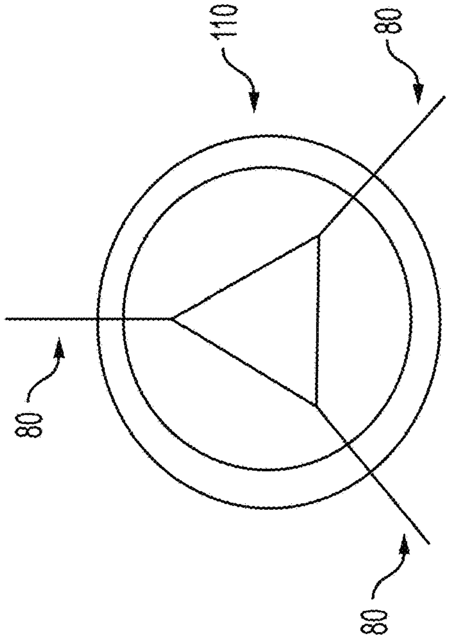
FIG. 10 is a top view of the guy wire/circular track arrangement for supporting the housing of the retrofitted turbine of the tower.
Figure 9:
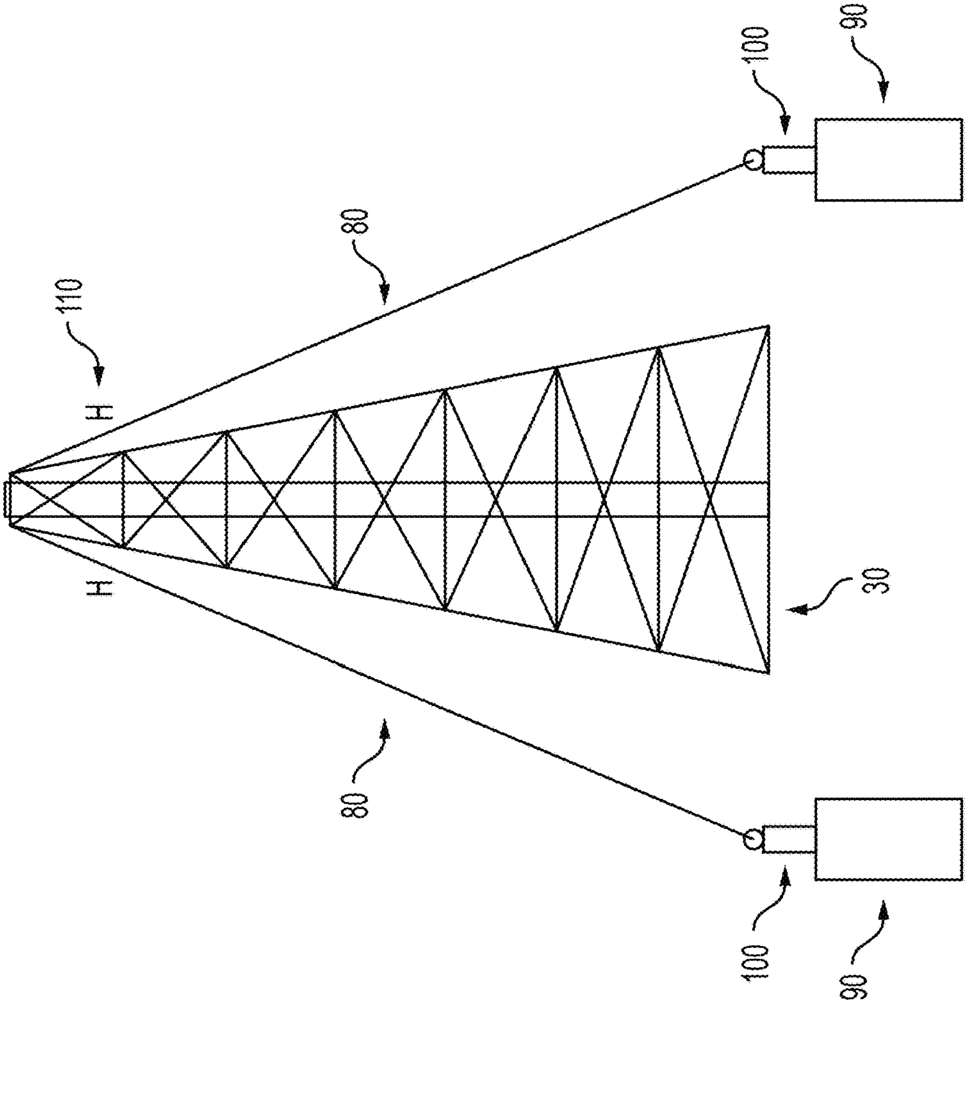
FIG. 9 is a side view of a guy wire/circular track arrangement for supporting the housing of the retrofitted turbine of the tower.

As illustrated in FIGS. 9 and 10, the existing tower 30 is equipped with three multistrand stainless steel guy wires 80 (two being visible in the FIG. 9 side view, all three being visible in the FIG. 10 top view) spaced evenly around the tower. As seen in both figures, a top end of each guy wire 80 is attached to a tower leg, and a bottom end of each guy wire 80 is attached to a permanent ground anchor 90 via a limited travel adjustable turnbuckle 100 to provide constant tension on each guy wire all the time. Like the turnbuckles 14 and 17, the adjustable turnbuckles 100 can be spring-loaded, or can be adjustable limited travel magnetically loaded turnbuckles.

As further illustrated in FIGS. 9 and 10, in a preferred embodiment, the track comprises a circular i-beam ring 110 bolted or otherwise mounted to the legs of the tower 30. Corresponding upper and lower wheels provided at the ends of the lower beams can engage with the ring 110 so as to safely be rotatably supported thereby while held within its respective upper and lower raceways. By providing for such a track arrangement, similar to a roller coaster, the wheels can be held within the track regardless of large external forces.

The detailed description above describes exemplary embodiments of fluid stream turbine assemblies. The invention is not limited, however, to the precise exemplary embodiments and variations described. Various changes, modifications and equivalents can be effected by one skilled in the art without departing from the spirit and scope of the invention as defined in the accompanying claims. It is expressly intended that all such changes, modifications and equivalents which fall within the scope of the claims are embraced by the claims.

What is claimed is:

1. A method of retrofitting a fluid stream turbine onto an existing propeller turbine having propellers mounted to a propeller shaft and that is supported by a multi-legged tower, the fluid stream turbine comprising:

a vertically-mounted vertical rotational axis post supporting a vertical rotational axis post bearing;

a horizontal flywheel comprising a wheel and a plurality of blades which protrude outward, the horizontal flywheel being rotatably mounted horizontally to the vertical rotational axis post; and a wind-blocker housing rotatably mounted to the vertical rotational axis post, wherein the wind-blocker housing comprises:

a curved side wall configured to cover a portion of a radial periphery of the horizontal flywheel;

a top horizontal wall configured to cover a portion of a top side of the horizontal flywheel, an adjustable rudder disposed on the top wall and configured to cause the wind-blocker housing to rotate such that a front of the wind-blocker housing always faces directly into a fluid stream;

a first diverter scoop disposed at the front of the wind-blocker housing and configured to direct a first portion of the fluid stream toward the plurality of blades; and a second diverter scoop disposed at a rear of the wind-blocker housing and configured to direct a second portion of the fluid stream toward the plurality of rear blades at the same time, the method comprising:

removing the propellers from the propeller shaft; and operatively connecting the fluid stream turbine to the propeller shaft.

2. The method according to claim 1, further comprising rotating the existing propeller shaft to a vertical orientation prior to operatively connecting the horizontal turbine flywheel to the propeller shaft.

3. The method according to claim 1, further comprising attaching a vertical drive wheel to the existing horizontal propeller shaft and then operatively connecting the horizontal turbine flywheel to the vertical drive wheel.

4. The method according to claim 3, wherein the vertical drive wheel is configured to be operatively connected to the horizontal flywheel by a gear arrangement between the vertical drive wheel and the horizontal flywheel.

5. The method according to claim 4, wherein the underside of the horizontal flywheel has a channel with rectangular notches around a 360 degree circle which mesh with a gear on the vertical drive wheel.

6. The method according to claim 3, wherein the vertical drive wheel is configured to be operatively connected to the underside of the horizontal flywheel by frictional engagement of a rubber tire tread on the vertical drive wheel with a circular channel on the horizontal flywheel.

7. The method according to claim 6, wherein the rubber tire tread is molded to the vertical wheel rim for semi-solid radial gripping with the horizontal flywheel.

8. The method according to claim 6, wherein the rubber tire tread is inflated with air gas, nitrogen gas, helium gas, and/or low density closed or open cell polyurethane foam.

9. The method according to claim 6, wherein the underside of the circular channel has a rough sandpaper surface, dimpled surface, or protrusions which create a tough grip round surface for the rubber tire to grab.

10. The method according to claim 1, wherein the wind-blocker housing is supported by beams which are lower than the horizontal flywheel.

11. The method according to claim 10, wherein the beams have a triangular cross-section.

12. The method according to claim 10, wherein the beams are supported by the vertical rotational axis post bearing.

13. The method according to claim 10, wherein the beams are supported by a circular i-beam track which is attached to the legs of the tower.

14. The method according to claim 13, further comprising equipping the tower with three multistrand stainless steel guy wires spaced evenly around the tower, attaching a top end of each guy wire to a tower leg at a point at which the tower leg supports the circular i-beam track, and attaching a bottom end of each guy wire to a permanent ground anchor with a limited travel adjustable turnbuckle for each guy wire to provide constant tension on each guy wire all the time.

15. The method according to claim 1, wherein the horizontal flywheel comprises a central ring supported by the vertical rotational axis post bearing, an outer ring supporting the blades, and a plurality of triangular cross-section beams extending radially between the central ring and the outer ring.

16. The method according to claim 15, wherein the fluid stream turbine further comprises a plurality of cables each having a first end rotatably supported, via an adjustable turnbuckle, by the vertical rotational axis post bearing, and a second end attached to and supporting the outer ring at the blades.

17. The method according to claim 1, wherein the fluid stream turbine further comprises a plurality of cables each having a first end rotatably supported, via an adjustable turnbuckle, by the vertical rotational axis post bearing, and a second end attached to and supporting the horizontal flywheel at the blades.

18. The method according to claim 1, wherein the retrofitted fluid stream turbine is configured such that flying creatures are not killed thereby, by removal of the propellers.

19. The method according to claim 1, further comprising providing a new vertical rotational axis post, which is attached through the generator housing to the top of the tower's structure to support the horizontal flywheel and the wind-blocker housing.

20. A fluid stream turbine comprising:

a vertical rotational axis post supporting a vertical rotational axis post bearing;

a horizontal flywheel comprising a wheel and a plurality of curved blades which protrude outward, the horizontal flywheel being rotatably mounted horizontally to the vertical rotational axis post bearing; and a wind-blocker housing rotatably mounted to the vertical rotational axis post bearing, wherein the wind-blocker housing comprises:

a curved side wall configured to cover a portion of a radial periphery of the horizontal flywheel;

a top horizontal wall configured to cover a portion of a top side of the horizontal flywheel, an adjustable rudder disposed on the top wall and configured to cause the wind-blocker housing to rotate such that a front of the wind-blocker housing always faces directly into a fluid stream;

a first diverter scoop disposed at the front of the wind-blocker housing and configured to direct a first portion of the fluid stream toward the plurality of blades; and a second diverter scoop disposed at a rear of the wind-blocker housing and configured to direct a second portion of the fluid stream toward the plurality of rear blades at the same time.

21. The fluid stream turbine according to claim 20, further comprising a propeller shaft from which propeller blades have been removed and the propeller drive is reoriented from horizontal to vertical to which the horizontal flywheel is operatively connected.

22. The fluid stream turbine according to claim 21, wherein the horizontal flywheel is directly connected to the propeller shaft.

23. The fluid stream turbine according to claim 20, further comprising a vertical drive wheel attached to the horizontal propeller shaft.

24. The fluid stream turbine according to claim 23, wherein the vertical drive wheel is operatively connected to the horizontal flywheel by a gear arrangement between the vertical drive wheel and the horizontal flywheel.

25. The fluid stream turbine according to claim 23, wherein the vertical drive wheel is operatively connected to the horizontal flywheel by frictional engagement of a rubber tire tread on the vertical drive wheel with a circular channel on an underside of the horizontal flywheel.

26. The fluid stream turbine according to claim 20, further comprising wind-blocker beams supporting the wind-blocker housing, wherein the beams are lower than the horizontal flywheel.

27. The fluid stream turbine according to claim 26, wherein the wind-blocker beams have a triangular cross-section.

28. The fluid stream turbine according to claim 26, wherein the wind-blocker beams are supported by a circular i-beam ring attached to legs of a tower supporting the fluid stream turbine.

29. The fluid stream turbine according to claim 28, wherein the inner end of the wind-blocker beams have wheels attached to them which fit inside the circular i-beam track thereby allowing the wind-blocker housing to rotate freely 360 degrees around the tower without coming loose under any stress conditions.

30. The fluid stream turbine according to claim 26, wherein the wind-blocker beams are supported by the vertical rotational axis post bearing.

31. The fluid stream turbine according to claim 20, wherein the wheel comprises a central ring supported by the vertical rotational axis post bearing, an outer ring supporting the blades, and a plurality of triangular cross-section beams extending radially between the central ring and the outer ring, and down to the central axis post bearing.

32. The fluid stream turbine according to claim 31, further comprising a plurality of cables each having a first end rotatably supported, via a magnetically adjustable turnbuckle, by the vertical rotational axis post bearing and a second end attached to and supporting the outer ring at the blades.

33. The fluid stream turbine according to claim 32, wherein the magnetically adjustable turnbuckles comprise high energy circular permanent magnets which repel each other.

34. The fluid stream turbine according to claim 32, wherein the magnetically adjustable turnbuckles comprise high energy controllable electromagnets which repel each other.

35. The fluid stream turbine according to claim 20, further comprising a plurality of cables each having a first end rotatably supported, via a magnetically adjustable turnbuckle, by the vertical rotational axis post bearing and a second end attached to and supporting the wheel horizontal flywheel at the blades.

36. The fluid stream turbine according to claim 35, wherein the magnetically adjustable turnbuckles comprise high energy circular permanent magnets which repel each other.

37. The fluid stream turbine according to claim 35, wherein the magnetically adjustable turnbuckles comprise high energy controllable electromagnets which repel each other.

38. The fluid stream turbine according to claim 20, wherein the plurality of blades are two feet wide by eight feet tall with a 32 square foot curved surface area per blade.

39. The fluid stream turbine according to claim 20, wherein the plurality of blades are corrugated on an inner surface only so that the internal curved surface area of the blade is increased without increasing overall external dimensions of the blade.

40. The fluid stream turbine according to claim 20, wherein the second diverter scoop extends both above the top and below the bottom of the turbine blades to force additional fluid stream energy from bottom and top of the blades at same time for additional thrust against rear turbine blades.

41. The fluid stream turbine according to claim 20, wherein the adjustable rudder has a large surface area, the rear trailing edge of the rudder that faces the fluid stream is adjustable from left to right by pivoting about a pivot point at the front of the rudder so the full rear rudder surface area can be moved left or right, and the adjusted position of the rudder can be locked in place by a set screw, so as to accommodate any unbalanced surface area of the scoops which might force the wind-blocker housing off center.

42. The fluid stream turbine according to claim 20, further comprising a heavy or light mass at an outer one-third edge of the horizontal flywheel.

43. The fluid stream turbine according to claim 20, further comprising multiple pivot point bearings along the vertical rotational axis post with separate rotational functions for each pivot point bearing.

44. The fluid stream turbine according to claim 20, wherein each blade is operatively mounted on a round protrusion attached to the wheel such that an orientation of the blades can be adjusted by adjusting an orientation of the blade relative to the round protrusion, and by a pair of bolts that fix the position of the blade.

45. The fluid stream turbine according to claim 20, wherein the turbine and drive wheel are precision balanced to extend useful service life and achieve greater efficiency.

* * * * *